Oct. 23, 1928.
G. Y. HARRY
1,688,493
CENTRIFUGAL HONEY EXTRACTOR
Filed Dec. 8, 1926
2 Sheets-Sheet 2
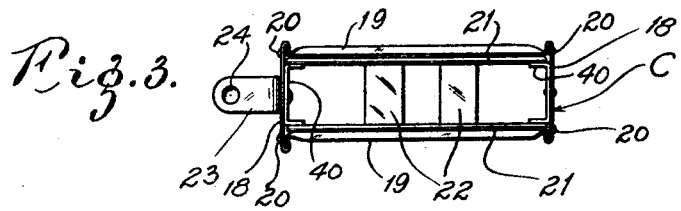
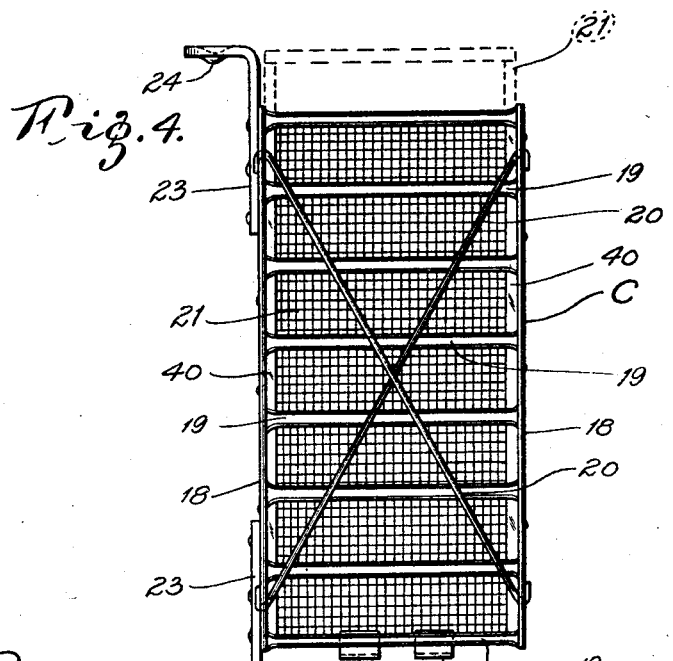
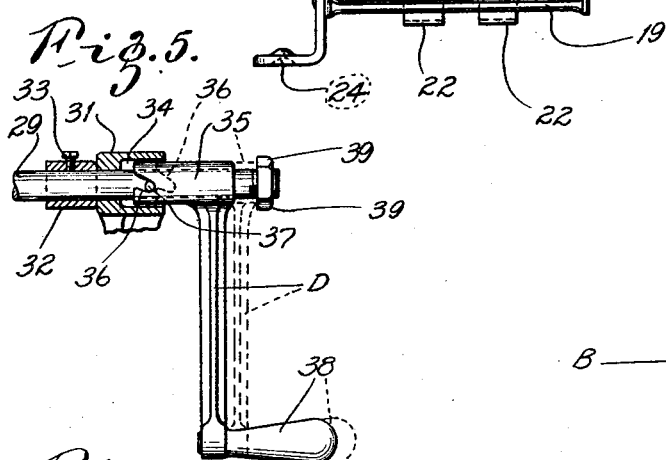
INVENTOR:
GEORGE Y. HARRY.
By James L. Hopkins,
ATTORNEY.

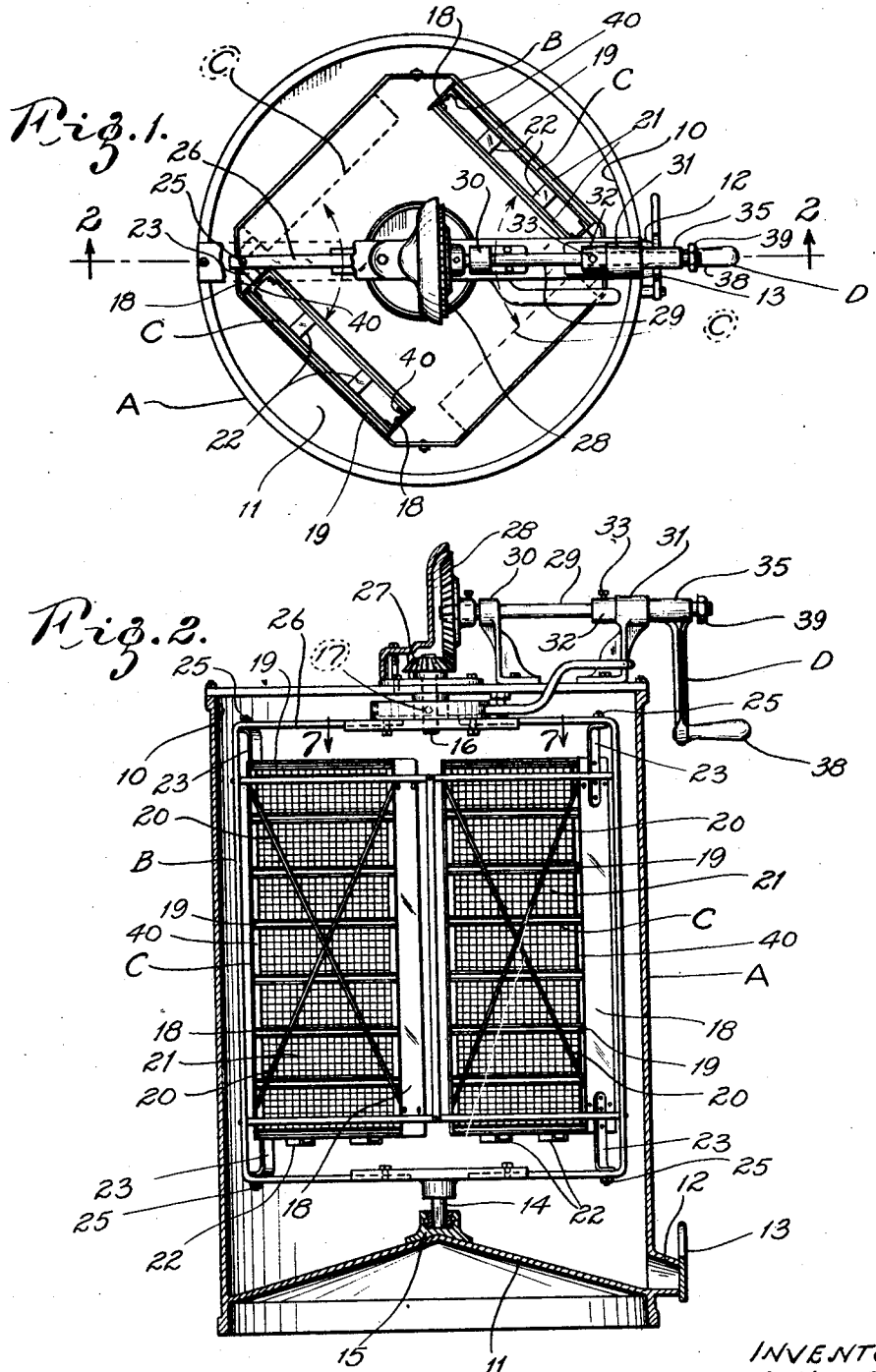

Patented Oct. 23, 1928.

1,688,493

UNITED STATES PATENT OFFICE.

GEORGE Y. HARRY, OF WAPAKONETA, OHIO.

CENTRIFUGAL HONEY EXTRACTOR.

Application filed December 8, 1926. Serial No. 153,432.

My invention relates to centrifugal honey extractors and has for its object to provide comb holders which are removably hinged to a rotatable frame, the hinging being accomplished by a pintle carrying each comb holder and removably secured to the frame by means of adjustable set-screws varying the pressure exerted upon the pintle. The frame is driven by a crank-handle through shafts connected by constantly intermeshed gears, the crank-handle being arranged to idle when not in use for imparting motion to the frame.

Other features of my invention are disclosed in the appended description.

Drawings.

In the drawings:

Fig. 1 is a top plan view of a machine embodying my invention.

Fig. 2 is a vertical midsectional view of the same, taken on the line 2—2 of Fig. 1.

Fig. 3 is a top plan view of one of the comb holders.

Fig. 4 is a side elevation of one of said comb holders.

Fig. 5 is an enlarged side elevation of the crank handle illustrating its mounting upon the driving shaft.

Fig. 6 is an enlarged detail of the adjustable mounting of the comb holder pintle in the frame.

Fig. 7 is a top plan view of a fragment of the top cross-bar of the frame, and its mounting upon the driven shaft, the fragment being indicated as 7—7 in Fig. 2.

Description.

The tub A has an open mouth 10 and closed bottom 11 and near its bottom has the draw-off spout 12 controlled by a gate-valve 13.

A frame B has a central bottom axle 14 mounted in the socket 15; its top being driven by the stub driven shaft 16 to which it is detachably secured by a set-screw 17 (see Fig. 7).

The comb holders C are constructed of vertical side-plates 18 connected by corrugated bars 19, and crossed rods 20 hooked at their terminals through the side plates 18. Upon the inner faces of the side plates 18 are the channeled plates 40 arranged as shown in Fig. 3 to provide for the reception of the framed screens 21, which are readily removed vertically from the open top mouth of the comb holder C, as shown in dotted lines in Fig. 4.

At its bottom the comb holder C is provided with cross-straps 22 which serve as stops for the comb content of the comb holder C. One of the side-plates 18 is provided at its top and bottom with the angle-irons 23 which serve with the side plate 18 whereon they are mounted to form a pintle for the comb holder C, so that the comb holder C may be reversed side-for-side as shown in Fig. 1 to facilitate the expulsion of the honey from both sides of the comb mass contained in the comb holder C.

Each of the angle-irons 23 is provided with an indentation 24 which engages with the inner terminal of the set-screw 25, mounted through the top-bar 26 of the rotatable frame B (see Fig. 6,) thus permitting the comb-holder C to be held in place in the frame B with a pressure permitting the ready unseating of said comb holder C for purposes of loading and cleansing when desired.

The driven shaft 16 is provided with a bevel gear 27 which is in mesh with the bevel gear 28 on the inner end of the driving shaft 29. The driving shaft 29 is journaled through the bearings 30—31. The collar 32 is mounted on the driving shaft 29 and fixed thereon by the set-screw 33, holding the driving shaft 29 at all times with its gear 28 enmeshed with the gear 27 on the driven shaft 16.

The bearing 31 has a central bore 34 to receive the inner end of the tubular base 35 of the crank handle D. The inner end of the tubular base 35 is provided with a slot 36, formed at an angle to the periphery of the driving shaft 29, thus being arranged, when the handle 38 is rotated in a clockwise direction, to engage with the pin 37, radially mounted and projecting from the driven shaft 29 (see Fig. 5).

When the operator disengages his hand from the handle 38 the impetus of the comb holder C will continue the clockwise revolution of the driving shaft 29 and pin 37, and the pressure of the pin 37 upon the forward edge of the slot 36 will force the crank handle D outwardly against the nut 39, when the pin 37 will be out of engagement with the slot 36, and the crank handle D will hang idle upon the driving shaft 29 in the position shown in Fig. 5.

The described construction may be varied or altered without departing from my invention as defined in the appended claims.

I claim:

1. A centrifugal honey extractor comprising a tub; a frame centrally and rotatably mounted in said tub and provided at its top and bottom with inwardly projecting set-screws arranged in pairs in vertical alinement with each other; a comb holder provided at its top and bottom with angle irons, each of said angle irons having an indentation arranged to engage with the inner terminal of one of said set-screws; in combination with means for rotating said frame.

2. In a device of the class described, a rotatable frame substantially rectangular in section; a pair of comb holders each having top-and-bottom angle-irons on one of its sides, each of said angle-irons having an indentation; set-screws adjustably mounted in said frame and arranged to engage said indentations, substantially as described.

In testimony whereof I have hereunto affixed my signature.

GEORGE Y. HARRY.